(12) United States Patent
Toprani

(10) Patent No.: US 9,092,128 B2
(45) Date of Patent: Jul. 28, 2015

(54) METHOD AND APPARATUS FOR MANAGING VISUAL INFORMATION

(75) Inventor: Shyam S. Toprani, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 12/785,408

(22) Filed: May 21, 2010

(65) Prior Publication Data

US 2011/0289427 A1    Nov. 24, 2011

(51) Int. Cl.
*G06F 3/048* (2013.01)
*G06F 3/0488* (2013.01)

(52) U.S. Cl.
CPC .... *G06F 3/0488* (2013.01); *G06F 2203/04804* (2013.01)

(58) Field of Classification Search
CPC ............. G06F 3/0481; G06F 2203/04804; G06F 3/0483; G06F 17/212; G06F 3/0482; G06F 3/0484; G06F 3/0488
USPC ............ 715/746, 768, 797, 808; 345/629
See application file for complete search history.

(56) References Cited

U.S. PATENT DOCUMENTS

| | | | |
|---|---|---|---|
| 4,555,775 A | 11/1985 | Pike | |
| 4,686,522 A | 8/1987 | Hernandez et al. | |
| 4,783,648 A | 11/1988 | Homma et al. | |
| 4,823,281 A | 4/1989 | Evangelisti et al. | |
| 4,827,253 A | 5/1989 | Maltz | |
| 4,868,765 A | 9/1989 | Diefendorff | |
| 4,914,607 A | 4/1990 | Takanashi et al. | |
| 4,954,970 A | 9/1990 | Walker et al. | |
| 4,959,803 A | 9/1990 | Kiyohara et al. | |
| 4,974,196 A | 11/1990 | Iwami et al. | |
| 4,992,781 A | 2/1991 | Iwasaki et al. | |
| 5,119,476 A | 6/1992 | Texier | |
| 5,124,691 A | 6/1992 | Sakamoto et al. | |
| 5,157,384 A | 10/1992 | Greanias et al. | |
| 5,185,808 A | 2/1993 | Cok | |
| 5,233,686 A | 8/1993 | Rickenbach et al. | |
| 5,252,951 A | 10/1993 | Tannenbaum et al. | |
| 5,260,697 A | 11/1993 | Barrett et al. | |
| 5,265,202 A | 11/1993 | Krueger et al. | |
| 5,283,560 A | 2/1994 | Bartlett | |
| 5,283,867 A | 2/1994 | Bayley et al. | |
| 5,307,452 A | 4/1994 | Hahn et al. | |

(Continued)

FOREIGN PATENT DOCUMENTS

| EP | 0280582 A2 | 8/1988 |
|---|---|---|
| EP | 0635779 A1 | 1/1995 |

(Continued)

OTHER PUBLICATIONS

Apple—iPhone—Lear how to us all the features of iPhone, website, http://www.apple.com/iphone/how-to/index.html, downloaded Mar. 18, 2010.

(Continued)

*Primary Examiner* — Steven Sax
*Assistant Examiner* — Christopher J Fibbi
(74) *Attorney, Agent, or Firm* — Schwegman Lundberg & Woessner, P.A.

(57) ABSTRACT

Efficiently managing visual information by small form factor electronic devices having limited display resources using a persistent overlay is described. The persistent overlay can be formed of selected visual information from a first page and can remain viewable over subsequently displayed pages.

20 Claims, 8 Drawing Sheets

(56) References Cited

U.S. PATENT DOCUMENTS

| | | | |
|---|---|---|---|
| 5,313,227 | A | 5/1994 | Aoki et al. |
| 5,313,571 | A | 5/1994 | Hirose et al. |
| 5,333,255 | A | 7/1994 | Damouth |
| 5,351,067 | A | 9/1994 | Lumelsky et al. |
| 5,367,453 | A | 11/1994 | Capps et al. |
| 5,425,137 | A | 6/1995 | Mohan et al. |
| 5,425,141 | A | 6/1995 | Gedye |
| 5,463,726 | A | 10/1995 | Price |
| 5,463,728 | A | 10/1995 | Blahut et al. |
| 5,467,441 | A | 11/1995 | Stone et al. |
| 5,467,443 | A | 11/1995 | Johnson et al. |
| 5,469,540 | A | 11/1995 | Powers, III et al. |
| 5,469,541 | A | 11/1995 | Kingman et al. |
| 5,475,812 | A | 12/1995 | Corona et al. |
| 5,491,495 | A | 2/1996 | Ward et al. |
| 5,524,190 | A | 6/1996 | Schaeffer et al. |
| 5,559,942 | A | 9/1996 | Gough et al. |
| 5,581,243 | A | 12/1996 | Ouellette et al. |
| 5,581,670 | A | 12/1996 | Bier et al. |
| 5,590,265 | A | 12/1996 | Nakazawa |
| 5,596,690 | A | 1/1997 | Stone et al. |
| 5,617,114 | A | 4/1997 | Bier et al. |
| 5,638,501 | A | 6/1997 | Gough et al. |
| 5,651,107 | A * | 7/1997 | Frank et al. .................. 715/768 |
| 5,652,851 | A | 7/1997 | Stone et al. |
| 5,729,704 | A | 3/1998 | Stone et al. |
| 5,798,752 | A | 8/1998 | Buxton |
| 5,798,844 | A | 8/1998 | Sakano et al. |
| 5,813,009 | A | 9/1998 | Johnson et al. |
| 5,818,455 | A | 10/1998 | Stone et al. |
| 5,831,615 | A | 11/1998 | Drews et al. |
| 5,895,475 | A | 4/1999 | Eisenberg |
| 5,949,432 | A | 9/1999 | Gough et al. |
| 5,959,626 | A | 9/1999 | Garrison et al. |
| 6,072,489 | A | 6/2000 | Gough et al. |
| 6,209,005 | B1 | 3/2001 | Harker |
| 6,240,414 | B1 | 5/2001 | Beizer et al. |
| 6,335,746 | B1 | 1/2002 | Enokida et al. |
| 6,499,040 | B1 | 12/2002 | Vu et al. |
| 6,551,357 | B1 | 4/2003 | Madduri |
| 6,664,979 | B1 | 12/2003 | Schofield et al. |
| 6,687,877 | B1 | 2/2004 | Sastry et al. |
| 6,859,909 | B1 | 2/2005 | Lerner et al. |
| 6,910,184 | B1 | 6/2005 | Yano et al. |
| 6,938,030 | B1 | 8/2005 | Simone, Jr. et al. |
| 6,964,013 | B1 | 11/2005 | Ono et al. |
| 7,047,487 | B1 | 5/2006 | Bates et al. |
| 7,168,048 | B1 | 1/2007 | Goossen et al. |
| 7,168,084 | B1 * | 1/2007 | Hendricks et al. .............. 725/42 |
| 7,191,407 | B1 | 3/2007 | Kluttz |
| 7,283,064 | B2 * | 10/2007 | He ................................ 340/973 |
| 7,505,046 | B1 | 3/2009 | Louveaux |
| 7,577,700 | B2 * | 8/2009 | Tolson et al. ................. 709/202 |
| 7,752,566 | B1 * | 7/2010 | Nelson ......................... 715/769 |
| RE41,922 | E | 11/2010 | Gough et al. |
| 2002/0003897 | A1 | 1/2002 | Tanaka |
| 2002/0011990 | A1 | 1/2002 | Anwar |
| 2002/0033838 | A1 | 3/2002 | Krueger et al. |
| 2002/0073123 | A1 | 6/2002 | Tsai |
| 2002/0116399 | A1 | 8/2002 | Camps et al. |
| 2002/0151347 | A1 | 10/2002 | Jorasch et al. |
| 2002/0167538 | A1 | 11/2002 | Bhetanabhotla |
| 2002/0198963 | A1 | 12/2002 | Wu et al. |
| 2003/0067630 | A1 | 4/2003 | Stringham |
| 2003/0110140 | A1 | 6/2003 | Morrison, III et al. |
| 2003/0221167 | A1 * | 11/2003 | Goldstein et al. ............. 715/513 |
| 2004/0090467 | A1 * | 5/2004 | Bonura et al. ................. 345/790 |
| 2005/0091578 | A1 * | 4/2005 | Madan et al. .................. 715/512 |
| 2005/0278585 | A1 * | 12/2005 | Spencer ........................... 714/46 |
| 2006/0277467 | A1 * | 12/2006 | Reponen et al. ............... 715/708 |
| 2008/0294981 | A1 * | 11/2008 | Balzano et al. ................ 715/256 |
| 2009/0293004 | A1 * | 11/2009 | Emam et al. ................... 715/762 |
| 2010/0041442 | A1 | 2/2010 | Hong |

FOREIGN PATENT DOCUMENTS

| | | |
|---|---|---|
| EP | 0635780 A1 | 1/1995 |
| EP | 0280582 B1 | 7/1995 |
| JP | 02-114319 A | 4/1990 |
| JP | 03-288891 A | 12/1991 |
| WO | WO 2008/095828 | 8/2008 |

OTHER PUBLICATIONS

"Adobe Acrobat 5", [Online]. [retrieved on Sep. 24, 2001]. Retrieved from the Internet: <www.adobe.com/products/acrobat/adobepdf.html>, (2001), 2 pgs.

U.S. Appl. No. 10/045,906, Advisory Action mailed Aug. 28, 2006, 3 pgs.

U.S. Appl. No. 10/045,906, Appeal Brief filed May 11, 2007, 26 pgs.

U.S. Appl. No. 10/045,906, Appeal Decision mailed Jul. 30, 2012, 12 pgs.

U.S. Appl. No. 10/045,906, Examiner's Answer mailed Sep. 6, 2007, 47 pgs.

U.S. Appl. No. 10/045,906, Final Office Action mailed Apr. 7, 2006, 41 pgs.

U.S. Appl. No. 10/045,906, Final Office Action mailed May 12, 2005, 48 pgs.

U.S. Appl. No. 10/045,906, Non Final Office Action mailed Oct. 21, 2004, 37 pgs.

U.S. Appl. No. 10/045,906, Non Final Office Action mailed Sep. 22, 2005, 43 pgs.

U.S. Appl. No. 10/045,906, Non Final Office Action mailed Dec. 22, 2006, 48 pgs.

U.S. Appl. No. 10/045,906, Notice of Allowance mailed Oct. 29, 2012, 23 pgs.

U.S. Appl. No. 10/045,906, Replacement Appeal Brief filed Mar. 6, 2009, 27 pgs.

U.S. Appl. No. 10/045,906, Reply Brief filed Nov. 6, 2007, 5 pgs.

U.S. Appl. No. 10/045,906, Response Filed Jan. 21, 2005 to Non Final Office Action mailed Oct. 21, 2004, 49 pgs.

U.S. Appl. No. 10/045,906, Response filed Jan. 26, 2006 to Non Final Office Action mailed Sep. 22, 2005, 40 pgs.

U.S. Appl. No. 10/045,906, Response filed Aug. 7, 2006 to Final Office Action mailed Apr. 7, 2006, 46 pgs.

U.S. Appl. No. 10/045,906, Response filed Aug. 12, 2005 to Final Office Action mailed May 12, 2005, 41 pgs.

U.S. Appl. No. 10/163,748, Amendment and Request for Reconsideration filed May 8, 2009 in Response to Non-Final Office Action mailed Feb. 9, 2009, 8 pgs.

U.S. Appl. No. 10/163,748, Amendment and Request for Reconsideration filed Oct. 17, 2008 in Response to Final Office Action mailed Apr. 18, 2008, 28 pgs.

U.S. Appl. No. 10/163,748, Final Office Action mailed Apr. 18, 2008, 27 pgs.

U.S. Appl. No. 10/163,748, Interview Summary and Advisory Action mailed Oct. 28, 2008, 4 pgs.

U.S. Appl. No. 10/163,748, Interview Summary and Supplemental Amendment filed Jun. 5, 2009, 6 pgs.

U.S. Appl. No. 10/163,748, Interview Summary mailed Jan. 16, 2007, 1 pg.

U.S. Appl. No. 10/163,748, Interview Summary mailed Nov. 6, 2007, 1 pg.

U.S. Appl. No. 10/163,748, Non-Final Office Action mailed Jan. 22, 2010, 4 pgs.

U.S. Appl. No. 10/163,748, Non-Final Office Action mailed Feb. 9, 2009, 11 pgs.

U.S. Appl. No. 10/163,748, Non-Final Office Action mailed Jun. 18, 2003, 32 pgs.

U.S. Appl. No. 10/163,748, Non-Final Office Action mailed Aug. 30, 2007, 23 pgs.

U.S. Appl. No. 10/163,748, Non-Final Office Action mailed Oct. 26, 2006, 15 pgs.

U.S. Appl. No. 10/163,748, Notice of Allowance mailed Jul. 28, 2010, 6 pgs.

U.S. Appl. No. 10/163,748, Reply filed Feb. 19, 2010 to Non-Final Office Action mailed Jan. 22, 2010, 34 pgs.

(56) References Cited

OTHER PUBLICATIONS

U.S. Appl. No. 10/163,748, Request for Continued Examination filed Nov. 17, 2008, 12 pgs.
U.S. Appl. No. 10/163,748, Request for Reconsideration filed Jan. 26, 2007 in Response to Non-Final Office Action mailed Oct. 26, 2006, 49 pgs.
U.S. Appl. No. 10/163,748, Request for Reconsideration filed Aug. 1, 2003 in Response to Non-Final Office Action mailed Jun. 18, 2003, 18 pgs.
U.S. Appl. No. 10/163,748, Request for Reconsideration filed Nov. 13, 2007 in Response to Non-Final Office Action mailed Aug. 30, 2007, 55 pgs.
U.S. Appl. No. 10/163,748, Supplemental Amendment filed Nov. 30, 2009, 6 pgs.
U.S. Appl. No. 12/437,500, Advisory Action mailed Sep. 14, 2011, 3 pgs.
U.S. Appl. No. 12/437,500, Amendment filed Feb. 28, 2011 in Reply to Non-Final Office Action mailed Oct. 27, 2010, 12 pgs.
U.S. Appl. No. 12/437,500, Amendment filed Aug. 18, 2010 in Reply to Non-Final Office Action mailed Mar. 19, 2010, 12 pgs.
U.S. Appl. No. 12/437,500, Amendment filed Aug. 31, 2011 in Reply to Final Office Action mailed Mar. 31, 2011, 16 pgs.
U.S. Appl. No. 12/437,500, Final Office Action mailed Mar. 31, 2011, 18 pgs.
U.S. Appl. No. 12/437,500, Non-Final Office Action mailed Mar. 19, 2010, 11 pgs.
U.S. Appl. No. 12/437,500, Non-Final Office Action mailed Jun. 6, 2012, 19 pgs.
U.S. Appl. No. 12/437,500, Non-Final Office Action mailed Oct. 27, 2010, 12 pgs.
U.S. Appl. No. 12/437,500, Notice of Allowance mailed Jan. 23, 2013, 5 pgs.
U.S. Appl. No. 12/437,500, Notice of Panel Decision mailed Oct. 11, 2011, 2 pgs.
U.S. Appl. No. 12/437,500, Preliminary Amendment filed May 7, 2009, 20 pgs.
U.S. Appl. No. 12/437,500, Response filed Dec. 6, 2012 to Non-Final Office Action mailed Jun. 6, 2012, 14 pgs.
U.S. Appl. No. 12/437,500, Submission and Request for Continued Examination filed Apr. 28, 2012, 21 pgs.
"Behind the Green Door, Deep Thoughts on Business Opportunities in Consumer Electronics", The Members of the Green Team, Sun Confidential and Proprietary, (Aug. 1991), 1-46.
"Beyond the Green Door, Further Thoughts on Business Opportunities in Consumer Electronics", Edward Frank and Michael Sheridan, Sun Confidential and Proprietary, (1992), 1-18.
"FirstPerson, Inc., A wholly-owned subsidiary of Sun Microsystems, Inc.—Business Plan", Edward Frank and Michael Sheridan, with David Lehman, Sun Confidential arid Proprietary, (Jun. 8, 1992), 60 pgs.
"The Green Door, Business Opportunities in Consumer Electronics", Sun Confidential and Proprietary, (Aug. 1992), 1-4.
Akeley, K., et al., "High-Performance Polygon Rendering", *Computer Graphics*, 22(4), (Aug. 1988), 239-246.
Angel, E., "Interactive Computer Graphics: A Top-Down Approach with OpenGL", Addison-Wesley Longman, Inc., Reading, MA, (1997), 57-58, 214-215, 412-414.
Bartlett, J. F., "Transparent Controls for Interactive Graphics", WRL Technical NoteTN-30, Digital Equipment Corporation, (Jul. 1992), 13 pgs.
Bier, E. A., et al., "A Taxonomy of See-Through Tools", *Proceedings of CHI '94*, (1994), 358-364 (15 pgs.).
Bier, E. A., et al., "Toolglass and Magic Lenses: The See-Through Interface", *Computer Graphics Proceedings, Annual Conference Series*, (Aug. 1993), 73-80.

Engelbart, D. C., et al., "A Research Center for Augmenting Human Intellect", *AFIPS Conference Proceedings of the 1968 Fall Joint Computer Conference*, vol. 33, San Francisco, CA, (Dec. 1968), 395-410.
Foley, J. D., et al., *Computer Graphics: Principles and Practice*, Second Edition, Addison-Wesley Publishing Company, Reading MA, (1990), 754-758, 909-910.
Hearn, D. et al., *Computer Graphics*, Second Edition, Prentice Hall, Inc., Englewood Cliffs, New Jersey, (1994), 508-511.
Ishii, H., et al., "ClearFace: Translucent Multiuser Interface for TeamWorkStation", In ACM SIGCHI Bulletin, 23(4), (Oct. 1991), 67-68.
Ishii, H., et al., "ClearFace: Translucent Multiuser interface for TeamWorkStation", *Proceedings of the Second European Conference on Computer-Supported Cooperative Work (ECSCW-91)*, Amsterdam, The Netherlands, Editors, L. Bannon, et al., (Sep. 1991), 163-174.
Ishii, H., "Toward an open shared workspace: computer and video fusion approach of TearnWorkStation", *Communications of the ACM*, 34(12), (Dec. 1991), 37-50.
Iverson, E. A. R., "Method to Allow Users to Select Transparent Color for Windows", *Research Disclosure*, No. 347, (Mar. 1993), 2 pgs.
Pearce, A., "Shadow Attenuation for RayTracing Transparent Objects", In: Graphic Gems, Academic Press, Inc., San Diego, CA, Glassner, A. S., Editor, (1990), 397-399.
Peck, W., "Photoshop Layers: The Freedom Tool", [Online]. [retrieved on Sep. 24, 2011]. Retrieved from the Internet: <www.webreference.com/graphics/column32, (2001), 4 pgs.
Peck, W., "Powerful Photoshop Layers: Layer Effects Basics", [Online]. [retrieved on Sep. 24, 2001]. Retrieved from the Internet: <www.webreference.com/graphics/column32/4.html>, (2001), 4 pgs.
Peck, W., "Powerful Photoshop Layers: Layer Effects Settings", [Online]. [retrieved on Sep. 24, 2001]. Retrieved from the Internet: www.webreference.com/graphics/column32/5.html, (2001), 5 pgs.
Peck, W., "Powerful Photoshop Layers: Linking and Merging Layers", [Online]. [retrieved on Sep. 24, 2009], Retrieved from the Internet: <www.webreference.com/graphics/column32/3.html, (2001), 5 pgs.
Peck, W., "Powerful Photoshop Layers: Super Power Layer Tools", [Online]. [rerieved on Sep. 24, 2009]. Retrieved from the Internet: <www.webreference.com/graphics/column32/6.html, (2001), 5 pgs.
Peck, W., "Powerful Photoshop Layers: Working with Layers", [Online]. [retrieved on Sep. 24, 2001]. Retrieved from the Internet: <www.webreference.com/graphics/column32/2.html>, (2001), 6 pgs.
Roberts, W. T., et al., "NeWs and X, Beauty and the Beast?", Department of Computer Science, Queen Mary College, London, England, (Jul. 25, 1988), 1-52.
Vince, J., *3D Computer Animation*, Addison-Wesley Publishing Company, Reading, MA, (1992), pp. 134, 314.
Webster, J. W., "Transparent Window Selection", *IBM Technical Disclosure Bulletin*, vol. 30, No. 11, (Apr. 1988), 268-270.
U.S. Appl. No. 10/045,906 , Response filed Dec. 19, 2013 to Non Final Office Action mailed Aug. 19, 2013, 19 pgs.
U.S. Appl. No. 10/045,906, Examiner Interview Summary mailed Oct. 30, 2013, 3 pgs.
U.S. Appl. No. 10/045,906, Non Final Office Action mailed Aug. 19, 2013, 33 pgs.
U.S. Appl. No. 10/045,906, Examiner Interview Summary mailed Oct. 28, 2008, 4 pgs.
U.S. Appl. No. 10/045,906, Final Office Action mailed May 12, 2014, 25 pgs.
U.S. Appl. No. 10/045,906, Final Office Action mailed Aug. 11, 2014, 18 pgs.
U.S. Appl. No. 10/045,906, Response filed Jul. 11, 2014 to Final Office Action mailed May 12, 2014, 8 pgs.

* cited by examiner

METHOD AND APPARATUS FOR MANAGING VISUAL INFORMATION

TECHNICAL FIELD

The embodiments described herein relate generally to the field of small form factor electronic devices. More particularly, the embodiments describe efficiently managing visual information presented by small form factor electronic devices having limited display resources.

BACKGROUND

An electronic device can take many forms such as, for example, a tablet computing device along the lines of an iPad™, a portable communication device such as an iPhone™, or a portable media player, such as an iPod™ each manufactured by Apple Inc of Cupertino Calif. Being inherently portable in nature, these devices can be sized to be both easily carried about and operated without the need to be placed upon a stationary surface such as desk or table. For example, with regards to the iPad™ (although somewhat larger than either the iPod™ or iPhone™), a user can easily hold the iPad™ in one hand while providing input commands at a touch sensitive display using the other hand. Although small in size, these devices can possess prodigious processing resources capable of providing vast amounts of information that for the most part are presented at a display having limited displayable area.

It is this dichotomy between the potential large amount of information made available by the processing resources of the small form factor electronic device and the comparatively small amount of displayable area on which to present this information that can lead to situations where both the display and a user are overwhelmed by the sheer amount of information. This is particularly salient due to the fact that the display by its limited size can only present limited portions of the available information at a time requiring the user to resort to ad hoc and mostly inefficient techniques for managing the visual information.

Therefore, a system, method, and apparatus for managing visual information presented by a small form factor electronic device having limited display resources are desired.

SUMMARY OF THE DESCRIBED EMBODIMENTS

In one embodiment, a method is described for efficiently managing visual information by an electronic device having a display. The method can be carried out by performing at least the following operations. A page of visual information is presented at the display. A portion of the presented visual information is identified for conversion to a persistent overlay. The identified portion of the visual information is converted to the persistent overlay. The visual information corresponding to the persistent overlay is automatically added to that of the page by overlaying a portion of the page with the persistent overlay. In a particular embodiment, at least some visual information displayed as the page and overlaid by the persistent overlay remains viewable. When another page of visual information is presented at the display, at least a portion of the other page is automatically overlaid by the persistent overlay and at least some visual information displayed as the other page and overlaid by the persistent overlay remains viewable.

In a particular implementation, the amount of overlaid visual information that remains viewable changes in accordance with a number of pages on which the persistent overlay is presented.

An electronic device arranged to present visual information at a display is described. The electronic device includes at least a processor and an input device in co-operative communication with the processor. The input device is used to provide at least an input signal, where the input signal is used by the processor to identify and process that portion of a page of visual information presented at the display as a persistent overlay. The processor automatically adds the visual information associated with the persistent overlay to that presented as the page by overlaying a corresponding portion of the page with the persistent overlay. In the described embodiment, at least some of the overlaid visual information of the page remains viewable. The processor further acts to add the visual information associated with the persistent overlay to that of a subsequently displayed page by overlaying a corresponding portion of the subsequently displayed page with the persistent overlay. In one embodiment, the persistent overlay can include updateable metadata in addition to and associated with the visual information of the persistent overlay.

The input device can include for example, a touch sensitive input layer as part of the display, or a mouse separate from the electronic device that can include a touch sensitive surface used to detect a user touch event in addition to movement along a surface upon which the mouse is supported to provide input signals to the electronic device.

A non-transitory computer readable medium arranged to store a computer code executed by a processor is described. The computer readable medium includes at least computer code for presenting a first page of visual information at a display, computer code for interpreting a input signal as identifying and rendering a portion of the presented visual information as a persistent overlay, computer code for adding the persistent overlay to the visual information presented at the display as the first page where the persistent overlay allows at least a portion of overlaid visual information presented as the first page to remain viewable, computer code for automatically adding the persistent overlay to a subsequently presented page of visual information where at least a portion of the overlaid visual information of the subsequently presented page remains viewable, and computer code for changing an amount of visual information that remains viewable in accordance with a number of pages that the persistent overlay is presented.

A method is described that can be carried out by performing at least the following operations, presenting a current page of visual information at a display where at least a portion of the visual information represents a software application, overlaying a portion of the current page with a persistent overlay at least a portion of which has associated metadata, granting the software application access to the metadata associated with the persistent overlay and operating on the accessed data by the software application. In one implementation, the portion of the persistent overlay associated with the metadata is a graphical icon suitable for display as part of a graphical user interface.

In one embodiment, the access of the metadata by the application can include using the metadata at the initial execution of the application. The access of the metadata can also include using the metadata to modify the execution of the application already in process. The granting of access can be carried out by dragging the icon to within a proximal location of the representation of the graphical icon.

Other apparatuses, methods, features and advantages of the described embodiments will be or will become apparent to one with skill in the art upon examination of the following figures and detailed description. It is intended that all such additional apparatuses, methods, features and advantages be included within this description be within the scope of and protected by the accompanying claims.

BRIEF DESCRIPTION OF THE DRAWINGS

The described embodiments and the advantages thereof can best be understood by reference to the following description taken in conjunction with the accompanying drawings.

DETAILED DESCRIPTION OF EXAMPLE EMBODIMENTS

Figure 1:
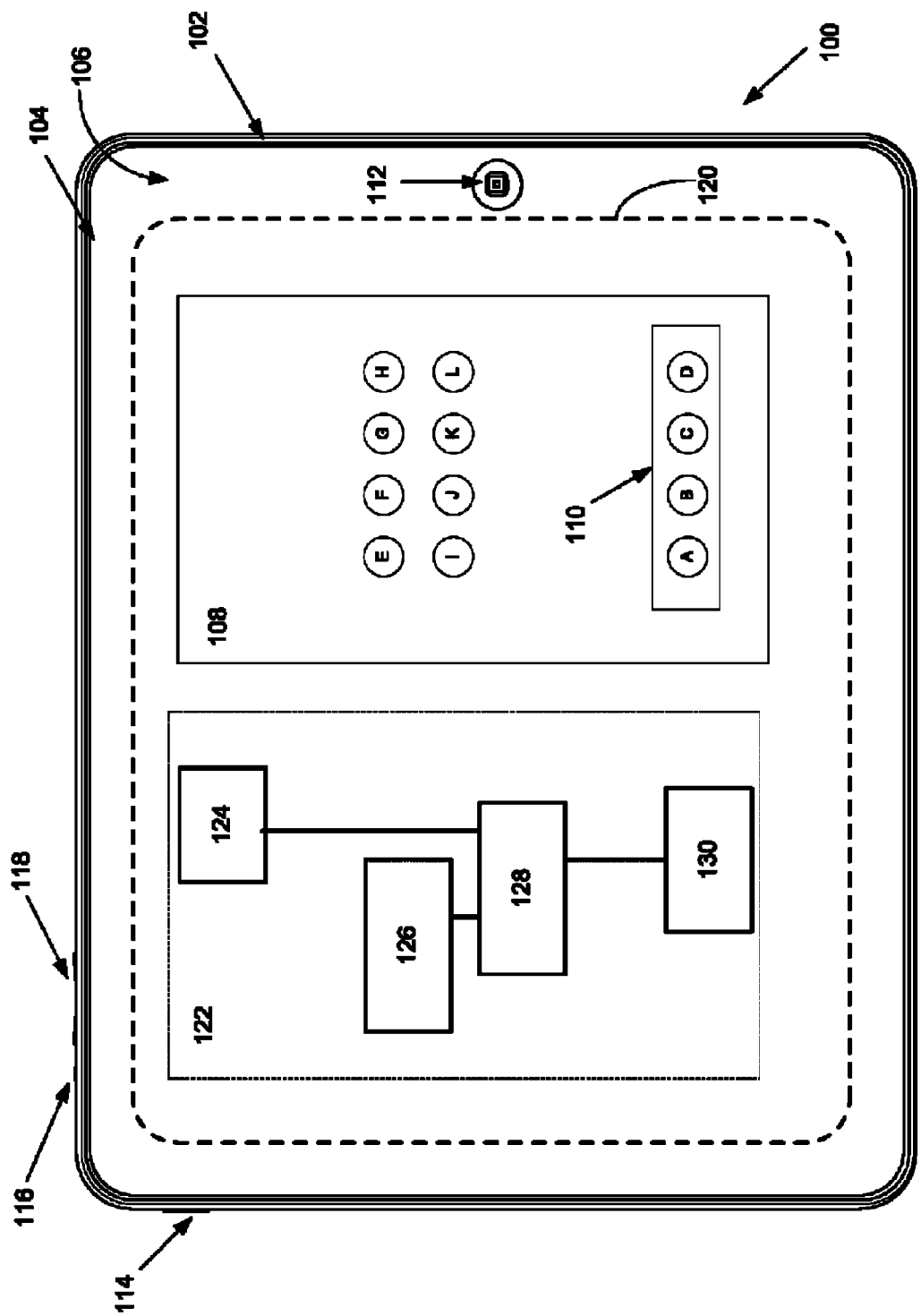
FIG. 1 illustrates a specific embodiment of an electronic device in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

The described embodiments relate to managing visual information presented by electronic devices. The techniques described for managing the visual information can be particularly well suited for those electronic devices having limited resource displays. For example, the electronic device can take the form of a small form factor electronic device along the lines of a iPod Touch™, iPhone™, or iPad™ each manufactured by Apple Inc. of Cupertino Calif. In one embodiment, an input signal provided from an input device can be used to identify, tag, or otherwise select those portions of a page of visual information presented at the display for conversion to a persistent overlay. The input device can take many forms such as a mouse separate from the electronic device that can detect touch events as well as movement along a supporting surface. The input device can also take the form of a touch sensitive layer incorporated into the display suitable for detecting a touch event created by, for example, a finger or other appropriate object. The identified visual information can then be processed to form the persistent overlay that is automatically added to the visual information presented at the display.

The persistent overlay can be rendered in a manner that allows at least some of the presented visual information overlaid by the persistent overlay to remain viewable. The persistent overlay can be presented at a subsequently presented page of visual information that allows at least some of the overlaid visual information to remain viewable. In some cases, the amount of overlaid visual information that remains viewable can change in accordance with a number of pages at which the persistent overlay is presented. For example, as the number of pages that the persistent overlay is presented increases, the amount of overlaid visual information that remains viewable also increases. In this way, the amount of overlaid visual information that remains viewable can provide an indication of an "age" of the persistent overlay. This is particularly useful in those situations where a display having a small screen size can become cluttered with "old" persistent overlays from earlier presented pages representing visual information that can be less relevant than more current, and therefore more readily viewable, visual information.

In some cases, the persistent overlay can be rendered translucent, or semi-transparent, so as not to completely obscure the overlaid visual information. In this way, the persistent overlay can remain viewable and yet unobtrusive. Accordingly, both the visual information and any associated data or metadata can be available for processing. The processing can include, for example, providing a mnemonic aid in the form of a visual cue (such as a telephone number or address), providing input data to an application (such as using the telephone number as input to a reverse directory lookup application or an address to a mapping application), and so on. The persistent overlay can take many forms such as textual, graphical, and video data. The persistent overlay can also be related to audio data (such as a media item encoded as an MP3 file). For example, an icon or other appropriate image can be used to represent a music item encoded as an MP3 file. In this way, the persistently displayed icon associated with the music item can remain viewable from one displayed page to another.

In order to facilitate the effective management of visual information in the form of the persistent overlay, a record in the form of, for example, a clipboard or the like can be maintained in a data storage device incorporated into or associated with the electronic device. In this way, there is no need to present all visual information associated with all available persistent overlays concurrently on the display. In this way, the possibility of a number of persistent overlays cluttering the display is greatly reduced or even effectively eliminated. The clipboard can take the form of a small icon that can identify a saved persistent overlay in a visually efficient manner (a drop down menu, or as a list of selectable icons, and so on). The persistent overlay can have associated with it metadata that can be made accessible to an application executable by a processor included in or in communication with the electronic device. In one embodiment, the application can access at least a portion of the metadata associated with the persistent overlay. For example, a deletion feature (that can take the form of a small "x") can be located in a convenient location relative to the persistent overlay that when selected can cause the small form factor electronic device to delete or at least render the persistent overlay as un-viewable. Other features can be used to minimize, drag and drop, expand the persistent overlay, and so on.

In some cases, the visual information associated with the persistent overlay can correspond to a data file (such as an MP3 file) having associated metadata. In other cases, the persistent overlay can itself have associated metadata. In any case, the metadata can be used as input data for subsequent processing. For example, in the case where the persistent overlay takes the form of a photograph of an object, metadata associated with the photograph can include metadata describing various physical aspects of the object, any location information associated with the object, and so on. In this way, in addition to providing visual information, metadata can be provided that can be used to further enhance a user's overall experience. For example, if a photograph illustrating an individual is selected as persistent overlay, then metadata associated with the individual (such as identity, local address, age, and so on) can be attached to or otherwise linked with the portion of the photograph presented as persistent overlay. By attaching or otherwise associating the metadata with the persistent overlay, the metadata can be used in subsequent processing, such as input to an application. In some embodiments, persistent overlay can be augmented with additional information. The additional information can be audio or visual in nature. For example, if the persistent overlay includes an image of a particular landmark (such as the Eiffel Tower), then a user can provide an audio comment (by speaking into an available microphone, for example) that can be added to the persistent overlay as either metadata or as a separate MP3 file linked to the persistent overlay.

Furthermore, the opacity (or conversely, the transparency) of the persistent overlay can vary from fully opaque (i.e.; fully blocking any overlaid visual content) to fully, or almost fully, transparent in which case most if not all of the overlaid visual content is viewable. In most cases, however, the opacity of the display visual information can be set to a value somewhere between almost completely opaque (i.e., ≈100% opaque) and completely transparent (i.e., ≈0% opaque). This variation in opacity can also vary depending upon the subject matter being overlaid. For example, if a user is "flipping" pages such that a new page is presented for every "flip", the persistent overlay can be presented on the display in a corner region of a currently displayed page at an opacity level of 80% so as to allow about 20% of the overlaid image to appear. This is typically the case when the content of the persistent overlay is particularly relevant and the user desires to maintain the image in full, or nearly full, view. When the user flips to a subsequent page, the opacity level of the visually displayed information can be set to a lower, more translucent, level (such as 20%) when the overlaid visual content of the subsequent page is more relevant or appears to be more relevant to the user than does the persistently displayed information. The opacity levels can, of course, be set to static levels that remain unchanged from one displayed page to another.

These and other embodiments are discussed below with reference to FIGS. 1-7. However, those skilled in the art will readily appreciate that the detailed description given herein with respect to these figures is for explanatory purposes only and should not be construed as limiting.

FIG. 1 illustrates a specific embodiment of electronic device 100 in accordance with the described embodiments. It should be noted, however, that the described embodiments can pertain to any small form factor electronic device without loss of generality. By way of example, the small form factor electronic device can generally correspond to a device that can perform as a music player, game player, video player, personal digital assistant (PDA), tablet computer and/or the like. For the remainder of this discussion, small form factor electronic device 100 is presumed to take the form of a tablet computer along the lines of the iPad™ that can display information in either a landscape mode (shown in FIG. 1) or portrait mode (shown in, for example, FIG. 2 and subsequent figures). Tablet device 100 can process data and more particularly media data such as audio, video, images, etc. With regards to being handheld, tablet device 100 can be held in one hand by a user while being operated by the user's other hand (i.e., no reference surface such as a desktop is needed). For example, the user can hold tablet device 100 in one hand and operate tablet device 100 with the other hand by, for example, operating a volume switch, a hold switch, or by providing inputs to a touch sensitive surface such as a display or pad.

Tablet device 100 can include single piece seamless housing 102 that can be sized to accommodate a display assembly fitted within opening 104 suitable for providing a user with at least visual content. In some cases, the display assembly can include both display elements (in the form of a display panel) and touch sensitive elements providing the user with the ability to provide tactile inputs to tablet device 100 using touch inputs. The display assembly can be formed of a number of layers including a topmost layer being a transparent protective layer 106 formed of polycarbonate or other appropriate plastic or highly polished glass. Using highly polished glass, protective layer 106 can take the form of cover glass 106 substantially filling opening 104. The display panel underlying cover glass 106 can be used to display images using any suitable display technology, such as LCD, LED, OLED, electronic or e-inks, and so on. In this way, the display panel can present visual content that can include video, still images, as well as icons in the form of a graphical user interface (GUI) that can provide information in the form of text, objects, graphics as well as receive user provided inputs. For example, representative GUI 108 can be used to visually organize various icons into specific regions. As shown in FIG. 1, GUI 108 can be arranged to include dock region 110 for visually organizing icons A-D each of which can be assigned a specific task. For example, when selected, icon A can be assigned the task of opening an Internet browser application, whereas icon B can be assigned the task of initiating a media management application, such as iTunes™. In some cases, GUI 108 can include icons E-L outside of dock region 110 each of which can be assigned other tasks to perform when selected. For example, icon E can be assigned the task of opening a mapping application used to identify map locations, present various maps, and provide directions to/from various map locations.

In some cases, icons can be moved by a user to a more convenient location on the display. For example, icons can be moved in and out of dock region 110 by the user manually dragging a selected icon from one location to another location. In some cases, an icon can be removed completely from GUI 108 or a new icon can be added. It should be noted that without loss of generality, graphical elements of GUI 108 are not limited to those shown in the accompanying figures but may also include without limitation a variety of displayed virtual input devices including virtual scroll wheels, a virtual keyboard, virtual knobs, virtual buttons, any virtual UI, and the like. In some cases, tactile feedback can be provided by a number of haptic actuators usually (but not always) arranged in an array of haptic actuators incorporated into the display. In this way, the haptic actuators can provide the user with tactile feedback.

In some embodiments, a display mask (not shown) can be applied to, or incorporated within or under cover glass 106. The display mask can be used to accent an unmasked portion of the display used to present visual content. The display mask can be used to make less obvious home button 112 used to provide a specific input such as change display mode, for example to tablet device 100. The display mask can render home button 112 less obvious by, for example, being closer in tone or color to home button 108. For example, when home button 112 is formed of a material that is somewhat darker (such as gray or black) than cover glass 106, using a similarly colored display mask can reduce the visual impact of home button 112 when compared with the unmasked portion of cover glass 106. In this way, the visual impact of home button 112 can be reduced by being integrated into the overall look of the display mask. Furthermore, the display mask can provide a natural mechanism for directing the attention of a viewer to the unmasked area of the display used to present visual content.

Tablet device 100 can include a number of mechanical controls for controlling or otherwise modifying certain functions of tablet device 100. For example, power switch 114 can be used to manually power on or power off tablet device 100. Hold button 116 can be used to disable the mechanical controls whereas volume switch 118 can be used to increase/decrease volume of the audio output by tablet device 100. It should be noted that each of the above described input mechanisms are typically disposed through an opening in housing 102 such that they can couple to internal components. In some embodiments, tablet device 100 can include a camera module configured to provide still or video images. The placement can be widely varied and may include one or more locations including for example front and back of the device, i.e., one through the back housing, the other through the display window.

Tablet device 100 can include touch sensitive panel 120 which is wholly or partially transparent, semitransparent, non-transparent, and opaque or any combination thereof. Touch sensitive panel 120 can be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input. In one example, touch sensitive panel 120 embodied as a touch screen can be partially or wholly positioned over at least a portion of a display. According to this embodiment, tablet device 100 functions to display graphical data and also functions to receive user input. In other embodiments, touch sensitive panel 120 can be embodied as an integrated touch screen where touch sensitive components/devices are integral with display components/devices. In still other embodiments a touch screen can be used as a supplemental or additional display screen for displaying supplemental or the same graphical data as a primary display and to receive touch input.

Touch sensitive panel 120 can be configured to detect the location of one or more touches or near touches on tablet device 100 based on capacitive, resistive, optical, acoustic, inductive, mechanical, chemical measurements, or any phenomena that can be measured with respect to the occurrences of the one or more touches or near touches in proximity to tablet device 100. Software, hardware, firmware or any combination thereof can be used to process the measurements of the detected touches to identify and track one or more gestures. A gesture can correspond to stationary or non-stationary, single or multiple, touches or near touches on tablet device 100. A gesture can be performed by moving one or more fingers or other objects in a particular manner on tablet device 100 such as tapping, pressing, rocking, scrubbing, twisting, changing orientation, pressing with varying pressure and the like at essentially the same time, contiguously, or consecutively. A gesture can be characterized by, but is not limited to a pinching, sliding, swiping, rotating, flexing, dragging, or tapping motion between or with any other finger or fingers. A single gesture can be performed with one or more hands, by one or more users, or any combination thereof.

Feedback can be provided to the user in response to or based on the touch or near touches on tablet device 100. Feedback can be transmitted optically, mechanically, electrically, olfactory, acoustically, or the like or any combination thereof and in a variable or non-variable manner.

When tablet device 100 is provided with touch sensing capabilities, a user can perform gestures at one or more particular locations associated with the graphical elements of GUI 108. In other embodiments, the user can perform gestures at one or more locations that are independent of the locations of graphical elements of GUI 108. Gestures performed at tablet device 100 can directly or indirectly manipulate, control, modify, move, actuate, initiate or generally affect graphical elements such as cursors, icons, media files, lists, text, all or portions of images, or the like within GUI 108. For instance, in the case of a touch screen, a user can directly interact with a graphical element by performing a gesture over the graphical element on the touch screen. Alternatively, a touch pad generally provides indirect interaction. Gestures can also affect non-displayed GUI elements (e.g., causing user interfaces to appear) or can affect other actions within tablet device 100 (e.g., affect a state or mode of a GUI, application, or operating system). Gestures may or may not be performed on tablet device 100 in conjunction with a displayed cursor. For instance, in the case in which gestures are performed on a touchpad, a cursor (or pointer) can be displayed on a display screen or touch screen and the cursor can be controlled via touch input on the touchpad to interact with graphical objects on the display screen. In other embodiments in which gestures are performed directly on a touch screen, a user can interact directly with objects on the touch screen, with or without a cursor or pointer being displayed on the touch screen.

Tablet device 100 can include a number of operational components 122 as illustrated in simplified form in FIG. 1. Operational components 122 can include without limitation video output circuit 124, data storage device 126, processor 128, and multiple sensors 130. It should be noted that even though only a limited set of components are shown this does not imply a limitation on the functional components that can be included in tablet device 100. For example, in addition to the components shown in FIG. 1, embodiments of tablet device 100 can also include a power connector, a data transfer component, a wireless telecommunications interface, voice recognition circuits, and audio circuits and so on.

Data storage device 126 can store data that can include media data in the form of, for example, audio data, textual data, graphical data, image data, video data and multimedia data typically in the form of data files. The stored data files can be encoded either before or after being stored using a variety of compression algorithms. For example, audio data can be compressed using MP3, AAC and Apple Lossless compression protocols whereas images can be compressed using, JPEG, TIFF and PNG compression. Moreover, video data can be compressed using H.264, MPEG-2 and MPEG-4 and so on. The stored media contained in the data storage device 126 can be accessed by processor unit 128 that can search and retrieve stored media for reproduction to a user of tablet device 100.

Tablet device 100 can include multiple sensors 130 that can function as, without limitation, an accelerometer, a gyroscope or another motion and or acceleration sensing device. Sensors 130 can detect at least a change in position, orientation or movement of tablet device 100. Typically, accelerometers can measure linear motion and accelerated linear motion directly, while gyroscopes can measure angular motion and angular acceleration directly. In some embodiments, sensor 130 can provide geographical location services to processor 128 along the lines of, for example, GPS, cellular phone location services, and so on. Sensors 130 can detect changes in position, orientation or movement, and acceleration along a number of different reference directions, singly or in combination.

Figure 2:
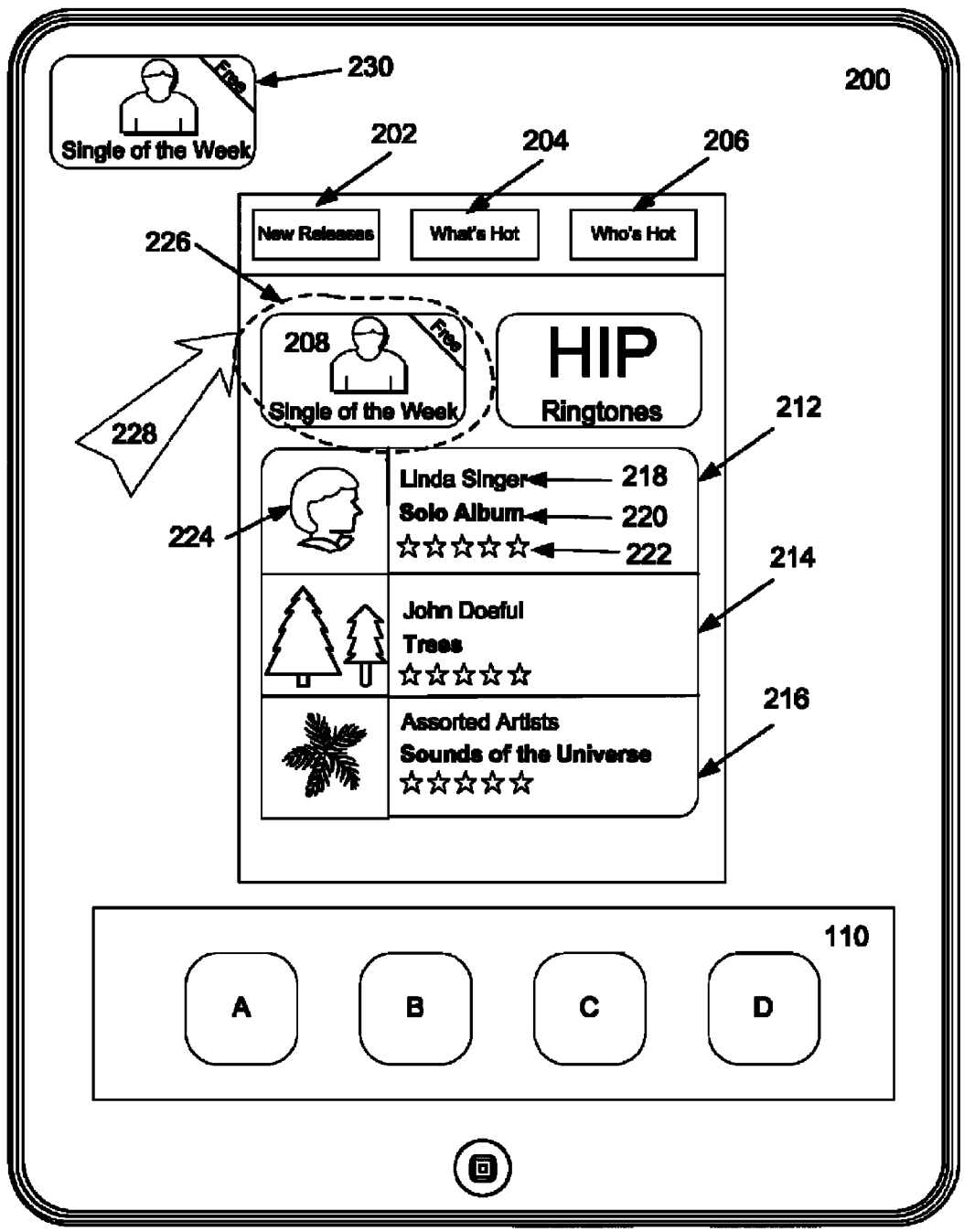
FIG. 2 shows a tablet device rotated in such a way as to cause the tablet device to present visual content in a portrait mode orientation.

FIG. 2 shows tablet device 100 rotated in such a way as to cause tablet device 100 to present visual content in the form of page 200 in a portrait mode. This can be accomplished using any number of well known orientation sensing mechanisms such as, for example, an accelerometer or other device capable of sensing the orientation of table device 100. In any case, in the example shown in FIG. 2, page 200 can provide the user of tablet device 100 with information related to various multimedia items stored in or otherwise available to tablet device 100. For example, tablet device 100 can connect either wirelessly or in wired manner to an external device that can take the form of, for example, a host computer capable of executing a media management application such as iTunes™. In this way, a large amount and variety of media items can be made available to the user for purchase or in some cases at no cost. It should be noted that the term "media item" is not intended to be limiting. Examples of media items can include songs, and/or other audio files videos, text documents, web pages, emails, pictures, etc. The mechanisms by which these media items are played can also vary. The embodiments described herein can be described in terms that are related to the selecting and/or playing of media items. Such embodiments may include instances where the corresponding media item file is not actually being stored on the device that is playing the media item. Examples of such embodiments include radios or home stereo devices. The embodiments may also be applied to devices that store portions, but not all, of the media items being played, such as in the case of streaming Internet radio, where a portion of the media item can be placed in a buffer to reduce errors that can be caused by latency problems during the streaming. Furthermore, the embodiment may also be applied to devices that store the entire media item, such as portable media players used to download media items from a home computer during general synchronization.

Page 200 can present visual information that can take the form of an index or catalog of media items available for download and/or direct play by tablet device 100. In this way, the user can peruse and if desired select for download for later play or streaming for immediate play a particular media item. For example, page 200 can include visual information in the form of icons 202-206 used to select media items using various media item characteristics that can include, for example, new media items ("New Releases" icon 202), currently popular media items ("What's Hot?" icon 204), and currently popular artist ("Who's Hot?" icon 206). Additional information related to specific media items can be presented as "Single of the Week" icon 208 having an indication that this particular media item can be acquired at no cost (i.e., as noted by the "Free" notation in the upper right hand corner of icon 208). Information that may be useful to the user of tablet device 100 can include icons 212-216 illustrating metadata for specific media items. For example, icon 212 can present information such as artist name ("Linda Singer") 218, media item title 220, user ratings 222 (or group ratings), and cover art 224.

In the context of the described embodiments, when a user wishes to retain at least some of the visual information presented in page 200 for subsequent processing, the user can, for example, select portion 226 of page 200 that can include at least visual data corresponding to "Single of the Week" icon 208. Portion 226 can be selected in any number of ways.

For example, selection tool 228 that can take the form of an arrow, pencil, pointer, or other representation of a pointing and/or grabbing device can be used to delineate a portion of page 200 for rendering as persistent overlay. In those cases where tablet device 100 includes a touch sensitive panel, portion 226 can be selected by way of a touch event such as a gesture applied at or near the surface of table device 100 using a finger(s) or any other appropriate gesture generating tool. Once portion 226 has been selected, tablet device 100 can render selected portion 226 as persistent overlay in the form of persistent overlay 230. In the described embodiment, persistent overlay 230 can be visually rendered in such a way to permit at least some of any overlaid visual information to remain at least viewable. This can be accomplished by varying the opaqueness of persistent overlay 230 from any value between 100% opaque (blocking almost all overlaid visual information) and about 0% opaque (allowing almost all overlaid visual information to remain viewable). In this way, persistent overlay 230 can provide a continuing visual presence at page 200 and any subsequently presented pages as desired.

Figure 3:
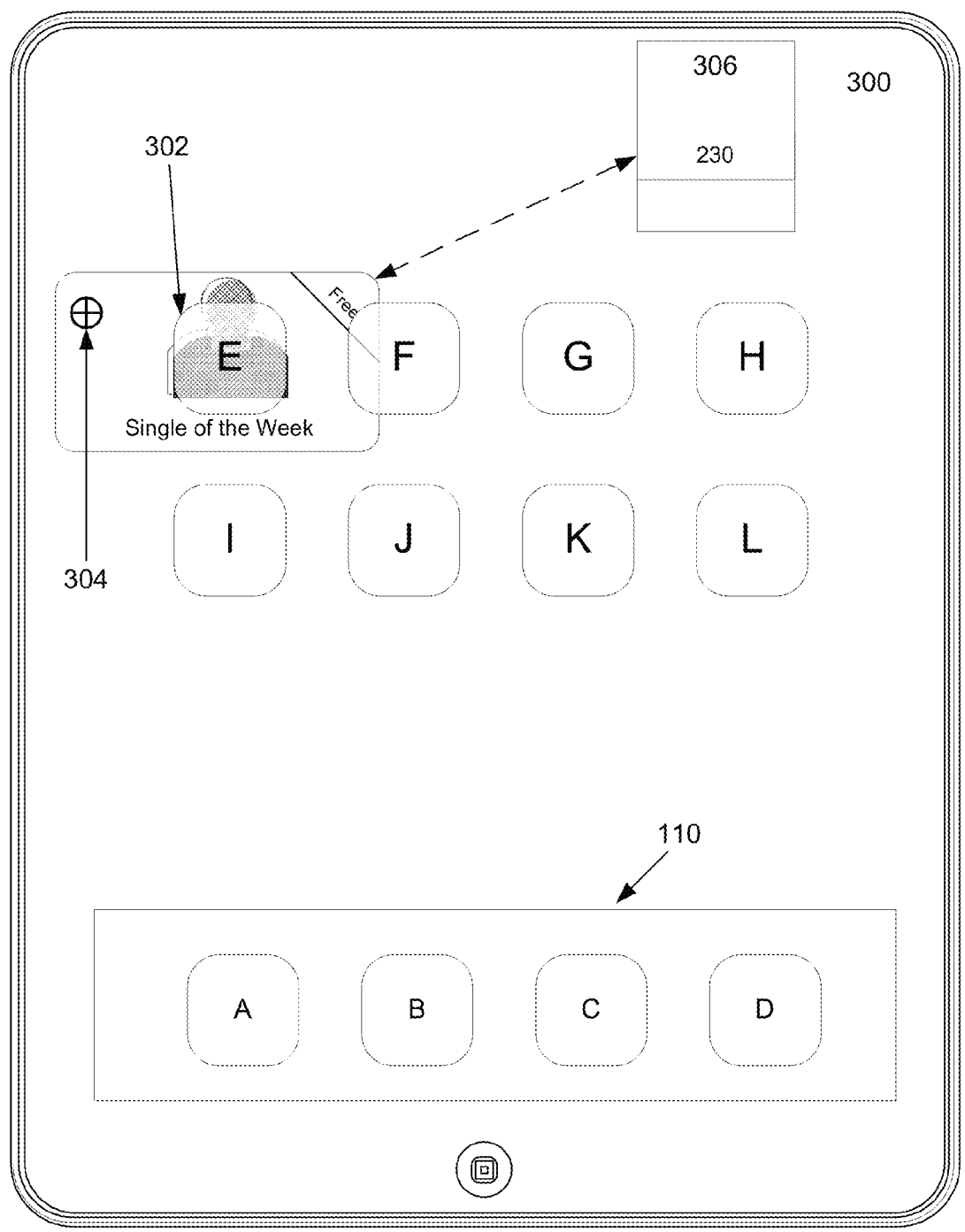
FIG. 3 shows the tablet device shown in FIG. 2 presenting visual content overlaid with a persistent overlay in accordance with the described embodiments.

FIG. 3 shows tablet device 100 presenting page 300 in the form of a graphical user interface along the lines of GUI 108 shown in FIG. 1. In the described embodiment, page 300 can correspond to visual information presented by tablet device 100 subsequent to the selecting and rendering of persistent overly 230. In this way, when the visual information presented by tablet device 100 is updated to page 300, persistent overlay 230 still remains viewable. As discussed above, persistent overlay 230 can take the form of selected portion 228 rendered in such a way as to appear translucent. In this way, that portion of page 300 overlaid (icon 302) by persistent overlay 230 remains at least partially visible. For example, if persistent overlay 230 is visually rendered to appear 80% translucent (i.e., about 20% of the overlaid portion of visual content is obscured from view), and then the visual content (i.e., letter "E") of icon 302 remains viewable. In this way, the user can retain the information related to persistent overlay 230 (i.e., the identification of the free single of the week) and yet still discern information contained with the overlaid portion of page 300. It should be noted that in some cases, the translucency of persistent overlay 230 can vary depending on the nature of the visual content corresponding to page 300. For example, if icon 302 represents information considered to be relatively more important than that represented by persistent overly 230, then the translucency of persistent overlay 230 can increase (i.e., become less visible) such that more of the overlaid portion of page 300 remains in view. On the other hand, when the relative importance of persistent overlay 230 increases, then the translucency of persistent overlay 230 can commensurably decrease (i.e., become more opaque).

In addition to providing information, persistent overlay 230 can provide features suitable for initiating execution of a process or processes related to the disposition of persistent overlay 230. For example, in order to perform any necessary housekeeping (i.e., maintaining a good and orderly appearance of page 300), feature 304 can be used to delete or otherwise remove persistent overlay 230 from view. In the case where feature 304 acts to initiate a deletion function, persistent overlay 230 (and any associated metadata) can be permanently erased or otherwise rendered inaccessible from a corresponding data storage device. On the other hand, when feature 304 acts to initiate a "remove from view" function, clicking or otherwise selecting feature 304 can cause persistent overlay 230 can be rendered un-viewable. Although not viewable, any data (including metadata) associated with persistent overlay 230 can remain stored within or at least available to data storage device 124. In some cases, an indication of persistent overlay 230 can be maintained by clipboard 306. In the described embodiment, clipboard 306 can provide an efficient mechanism for tracking or otherwise memorializing any number of persistent overlays thereby preserving available displayable area and maintaining a neat and orderly appearance for page 300. Clipboard 306 can be any visually efficient mechanism such as a drop down menu that can be activated by clicking, for example, a clipboard icon for a full release of the drop down menu (as shown). Alternatively, if only a portion of clipboard 306 is to be shown, then clicking and dragging the clipboard icon can effect a "shade" effect whereby only that portion of clipboard 306 released by the dragging of clipboard icon can be viewed.

Figure 4A:
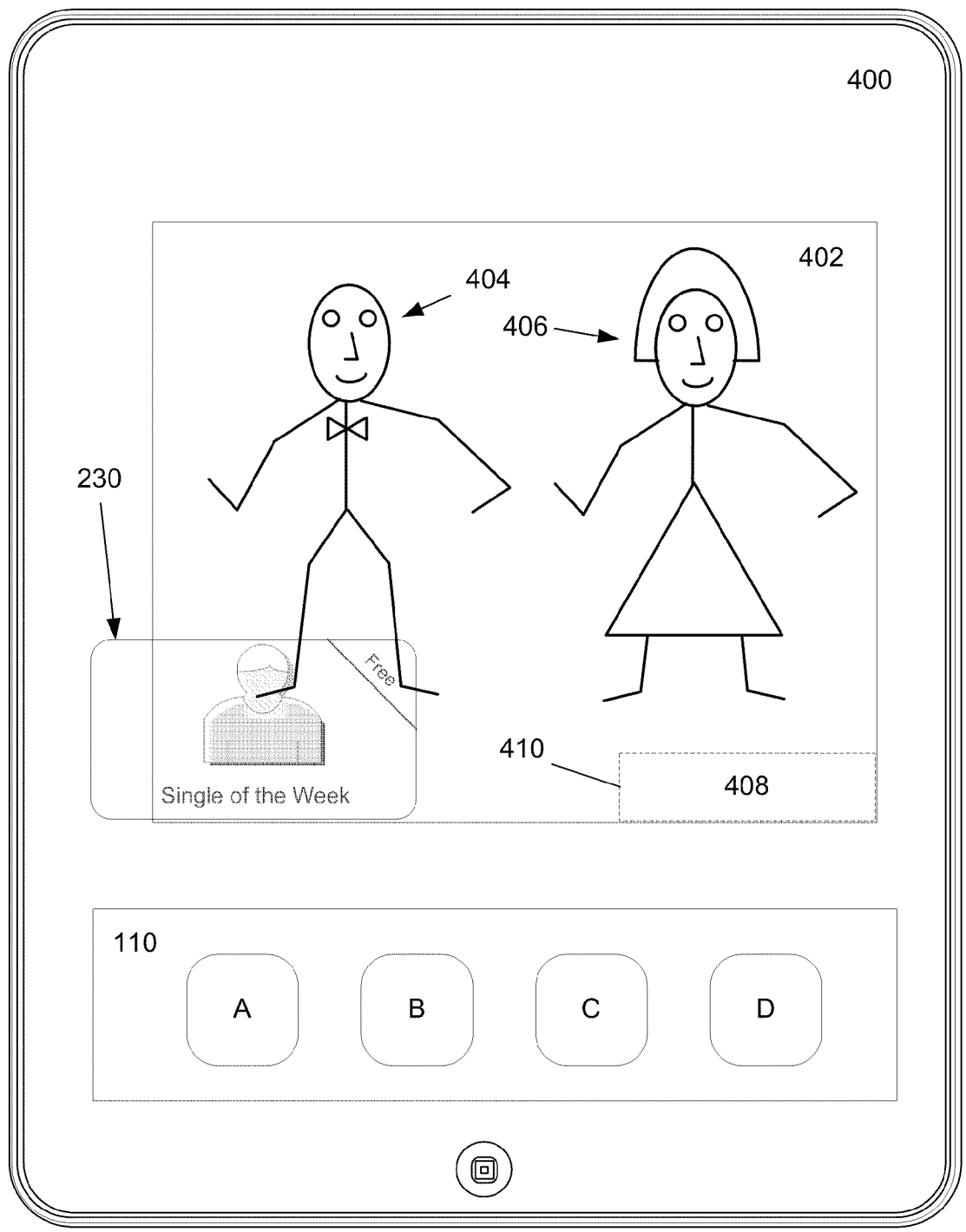
FIGS. 4A-4B shows the persistent overlay of FIG. 3 overlaying subsequently presented visual content in accordance with the described embodiments.

FIG. 4A illustrates another embodiment whereby persistent overlay 230 remains viewable over a portion of page 400 that includes visual information related to media item 402 (which in this example can represent a photograph, video, web page, and so on). It should be noted that persistent overlay 230 has been re-located to a position in a lower left section of page 400 compared to the upper right region of page 300 shown in FIG. 3. In this way, persistent overlay 230 can be moved about to any appropriate location. Page 400 can present visual information that can include images of individuals 404 and 406, respectively. In some instances, media item 402 can have associated metadata 408 describing aspects of media item 402. Such aspects can include, for example, image information related to a type of image (JPEG, TIFF, etc) represented by media item 402, information related to individuals 404 and 406 (name, home address, etc., if available). It should be noted that all, or at least most, of the available metadata for a particular media item is stored as part of tag 410 for media item 402. For example, one common way to store audio files in a computer or portable media device uses the Moving Picture Experts Group-I Audio Layer 3 (MP3) protocol. This protocol includes metadata information stored in an I21 container, where title, artist, album, track number, and other information about the media item to be stored in the file itself. In one embodiment, this I21 container is simply copied and used as the tag for the media item. In another embodiment, only some of the fields in the I21 container are copied and used as the tag. The metadata can be embedded at multiple places depending upon the type of the media item and the mechanism of transmission. Metadata can also include a timestamp indicating the data and time that the media item was tagged. In some embodiments, this timestamp can be utilized to aid in the identification of the media item. The amount of metadata stored in or associated with tag 410 may vary, even in a single embodiment, based upon the type of the media item and the source of the media item. Tag 410 can include information about whether the media item was tagged at home or at work. This information can be utilized to provide current location information, or provide a history of location information. This history of location information can be useful in tracking movements of the device capturing or otherwise modifying the particular media item.

Figure 4B:
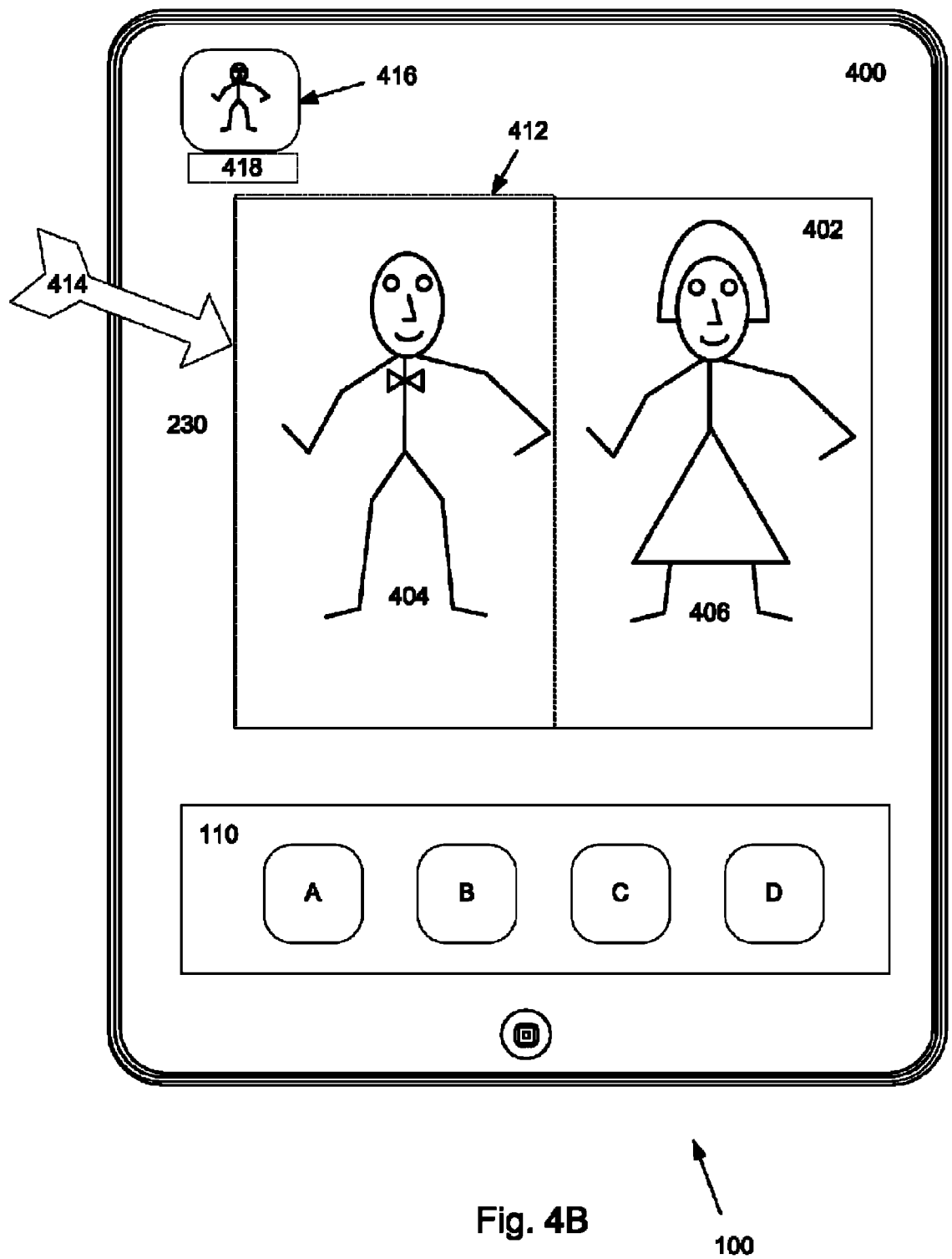

Turning now to FIG. 4B, a user can select portion 412 of media item 402 using selection tool 414. Typically, the user would likely move persistent overlay 230 out of the way while selecting portion 412. However, since information related to persistent overlay 230 is retained in clipboard 306 (or its equivalent), persistent overlay 230 can be completely removed from page 400 while still retaining the option for the user to recover all or part of persistent overlay 230 at a later time. Accordingly, presuming that persistent overlay 230 has been removed or at least rendered un-viewable; the user can indicate that portion of media item 402 to be rendered by tablet device 100 as persistent overlay 416. In this case, persistent overlay 416 represents individual 404 and any associated metadata 418. In keeping with the described embodiments, persistent overlay 416 can be placed at any location on page 400. Furthermore in this case, the user considers persistent overlay 416 to be important enough that tablet device 100 has been instructed to render the selected portion of media item 402 as almost opaque (i.e., transparency less than about 10%) thereby essentially blocking from view most features of any overlaid visual content of page 400.

Figure 5:
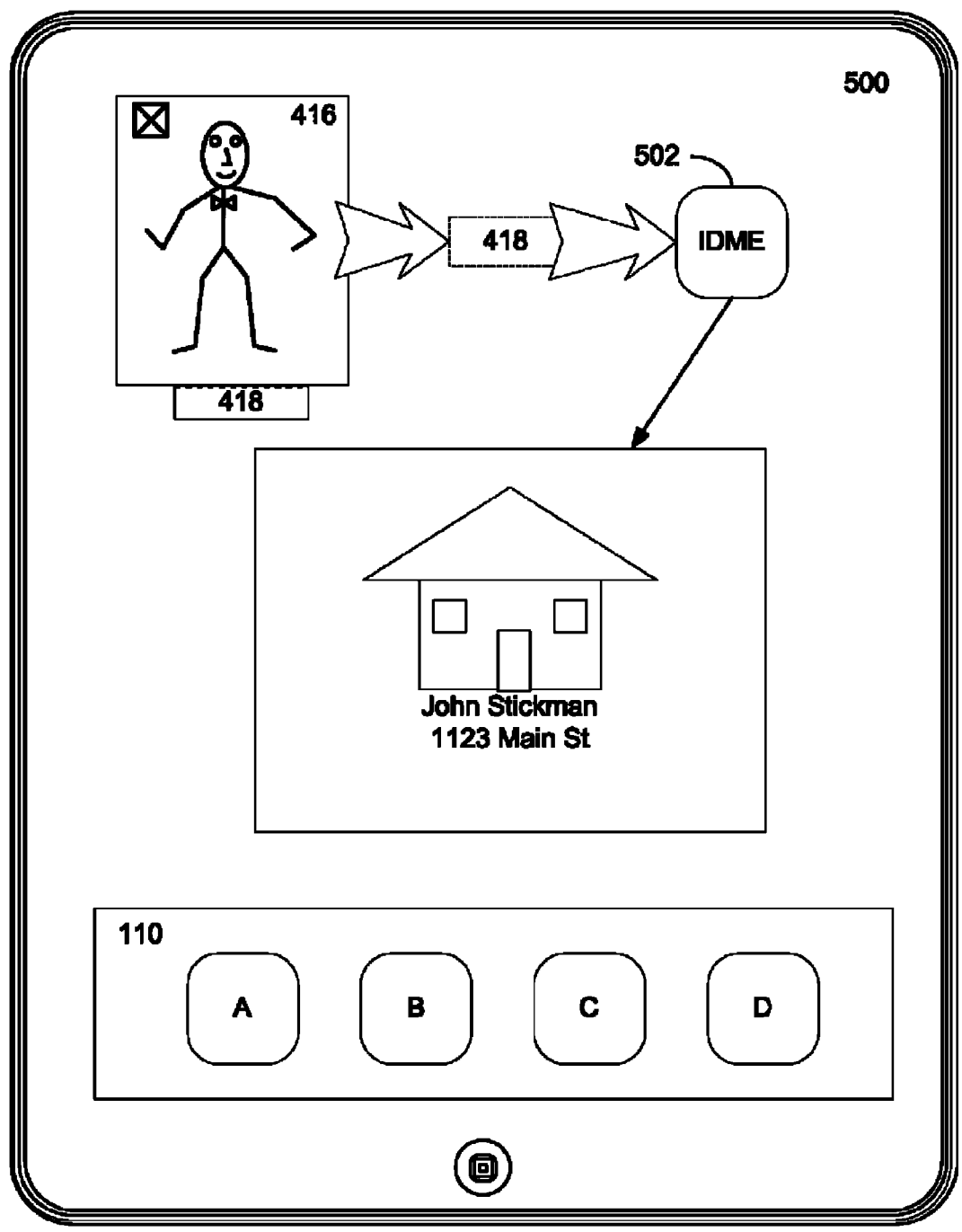
FIG. 5 shows a portion of visual content shown in FIG. 4B rendered as a persistent overlay providing input to an application in accordance with the described embodiments.

In one embodiment, metadata 418 associated with persistent overlay 416 can be further processed. For example, as shown in FIG. 5, persistent overlay 416 can be displayed as part of page 500 presenting visual content that can include at least application icon 502 used to initiate execution of (in this case) an identification application IDME. Identification application IDME can use metadata associated with a particular image (which in this case is that of individual 404) to establish at least a tentative identity and in some cases a residence address and/or phone number. In this example, the user can provide input data to application IDME by dragging persistent overlay 416 to application icon 502. In this way, metadata 418 (or at least portions of metadata 418) can be provided as input to application IDME. Application IDME can use metadata 418 to resolve the identity (or at least suggest an identity) of individual 404 and if possible information such as a residence address and/or phone number. Of course, it is anticipated that this information is only made available by individual 404 with the expectation that it would be used for purposes of name and address identification. This is particularly useful in social networking situations where people can meet other people for only a moment and wish to make further contact.

Figure 6:
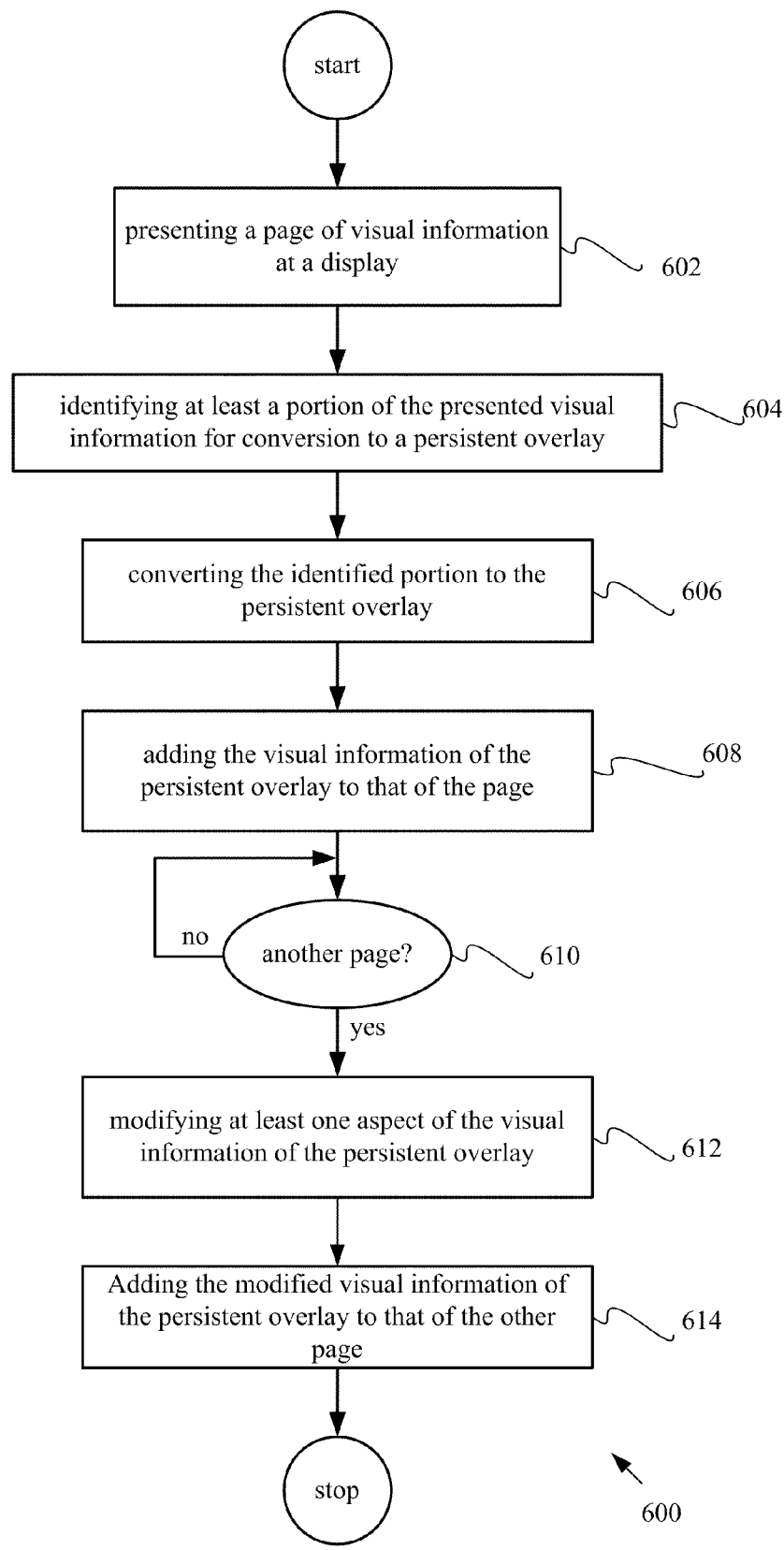
FIG. 6 shows a flowchart detailing a method for providing a persistent overlay in accordance with the described embodiments.

FIG. 6 shows a flowchart detailing process 600 in accordance with the described embodiments. Process 600 can be carried out by performing at least the following operations. At 602, visual information corresponding to a current page is presented at a display. In the described embodiments, the display can be used to display images using any suitable display technology, such as LCD, LED, OLED, electronic or e-inks, and so on. In this way, the display can present visual information such as video, still images, as well as icons in the form of a graphical user interface (GUI) that can provide information in the form of text, objects, graphics as well as receive user provided inputs. At 604, at least a portion of the presented visual information is identified for further processing for conversion to a persistent overlay. The identification can be carried out using an input device such as a mouse, a touch pad, or a touch sensitive layer incorporated into the display. The identified portion is then converted to the persistent overlay at 606. In the described embodiment, the persistent overlay can have an initial location at any point on the display and can also be moved to any other location on the display. The movement of the persistent overlay can be carried out using the input device by, for example, moving the mouse along the supporting surface or apply a user's finger to the touch sensitive display. In some cases, the persistent overlay can include metadata. The metadata can include information describing the persistent overlay including location data, image type data and so on. The persistent overlay can appear translucent (i.e., semi-transparent) so as not to completely obscure overlaid visual content. In some cases, the translucency of the persistent overlay can range from about 100% opaque to about 0% opaque and can vary based upon extrinsic factors such as relative importance of the visual content represented by the persistent overlay and a number of pages on which the persistent overlay appears. At 608, the visual information associated with the persistent overlay is added to that of the page and at 610 a determination is made if there is another page of visual information for display. When it is determined that there is another page of visual information for display, the visual information associated with the persistent display is modified at 612. The modification can take the form of increasing or decreasing a transparency factor of the persistent overlay to increase or decrease, respectively the amount of overlaid visual information the remains viewable. This can be useful for providing a quick indication of how many or how often a particular version of a persistent overlay has been displayed. In any case, the modified visual information corresponding to the persistent overlay is then added to that of the other page at 614.

Figure 7:
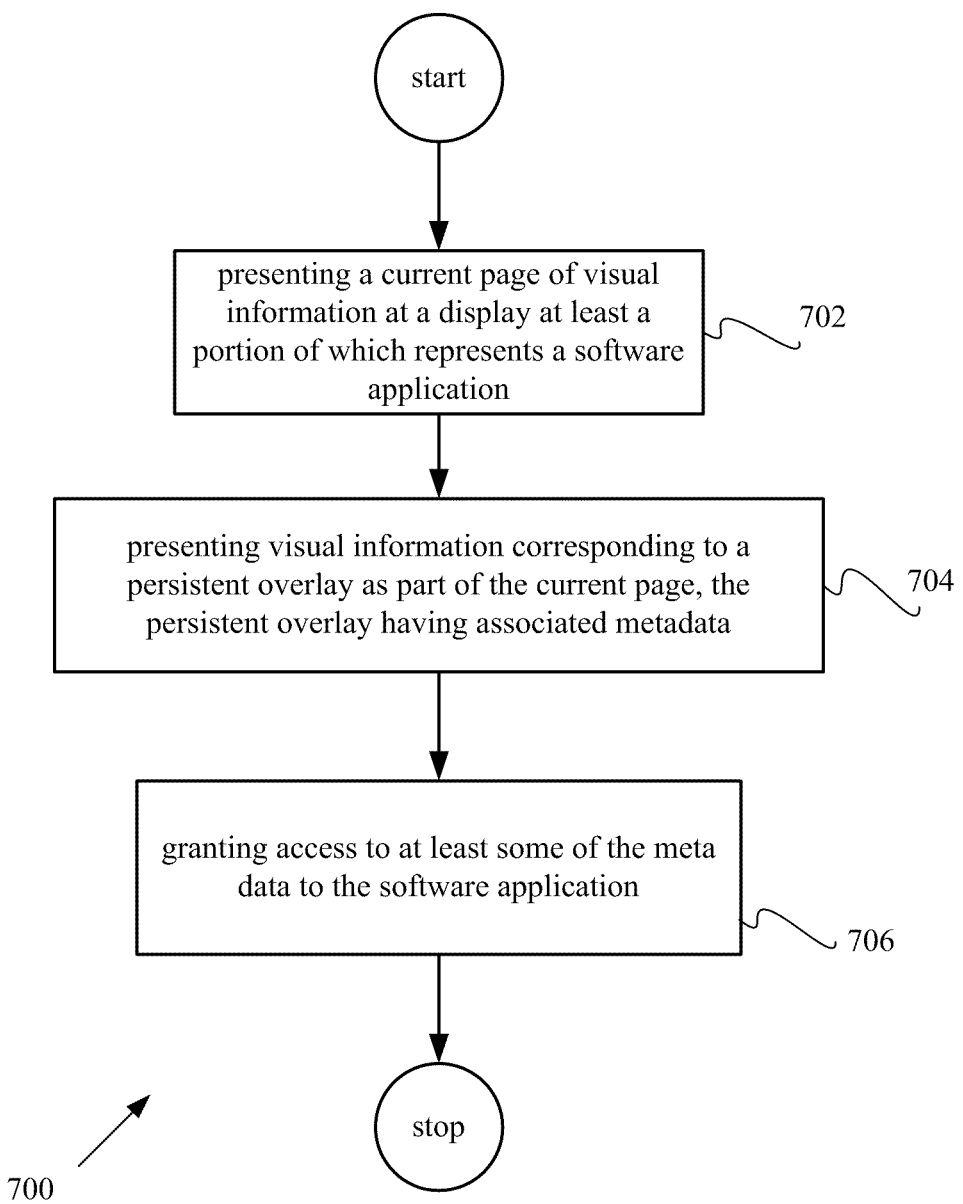
FIG. 7 shows a flowchart detailing a process for using metadata associated with a persistent overlay in the execution of an application in accordance with the described embodiments.

FIG. 7 shows a flowchart describing process 700 for using metadata associated with a persistent overlay in the execution of an application in accordance with the described embodiments. Process 700 begins at 702 by presenting a current page of visual information at a display. The current page of visual information can include textual data, graphical data, video data, and so forth. At 704 a portion of the current page is overlaid with a persistent overlay generated during a presenting of previous page of visual information. In the described embodiment the persistent overlay is associated with metadata providing information about the persistent overlay. At 706, an application visual indicator is identified as part of the visual information of the current page. At 708, at least some of the metadata associated with the persistent overlay is used as input data to the application. At 710, the application associated with the application visual indicator uses at least some of the metadata associated with the persistent overlay for execution.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations, or as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The embodiments were chosen and described in order to best explain the underlying principles and concepts and practical applications, to thereby enable others skilled in the art to best utilize the various embodiments with various modifications as are suited to the particular use contemplated. It is intended that the scope of the embodiments be defined by the following claims and their equivalents.

What is claimed is:

1. A method, comprising:
   presenting a first page of visual information at a display;
   identifying a portion of the presented visual information for conversion to a persistent overlay;
   converting the identified portion to the persistent overlay, wherein the persistent overlay corresponds to information that remains accessible on the first page and, at least in part, at a plurality of subsequently presented pages of visual information;
   adding the visual information corresponding to the persistent overlay with the visual information of the first page by overlaying a corresponding portion of the first page with the persistent overlay, wherein at least some visual information displayed as the first page and overlaid by the persistent overlay remains viewable;
   in response to updating the display to present a second page of the plurality of subsequently presented pages, automatically overlaying a portion of the second page with the persistent overlay such that at least some visual information displayed as part of the second page, and overlaid by the persistent overlay, remains viewable, wherein:
      the persistent overlay is rendered in accordance with a relative importance of the persistent overlay to the second page;
      the second page and the persistent overlay are presented as a unified visual field; and
      the information presented as the unified visual field includes an area of the second page presenting an application icon arranged to initiate execution of a corresponding application, the application processing data associated with the persistent overlay corresponding to the second page.

2. The method as recited in claim 1, further comprising:
   changing the amount of visual information of the persistent overlay that remains viewable at the plurality of subsequently presented pages in accordance with a number of pages on which the persistent overlay is presented.

3. The method as recited in claim 2, further comprising:
   modifying the second page immediately after the second page is rendered to include the persistent overlay; and
   storing a persistent overlay identifier used to identify the persistent overlay in a data storage device.

4. The method as recited in claim 3, further comprising:
   associating metadata with the persistent overlay, wherein the metadata provides ancillary information about the persistent overlay.

5. The method as recited in claim 4, further comprising:
   accessing the metadata associated with the persistent overlay by an application.

6. The method as recited in claim 1, wherein the adjusting the rendering comprises:
   adjusting a transparency value of the persistent overlay by increasing the transparency value when the relative importance of the persistent overlay decreases and decreasing the transparency value when the relative importance of the persistent overlay increases.

7. The method as recited in claim 1, wherein the adjusting the rendering comprises:
   adjusting a transparency value of the persistent overlay by increasing the transparency value in direct relation to a number of subsequent pages beyond a threshold number of pages following the first page.

8. The method as recited in claim 1, wherein determining the relative importance value of the persistent overlay is based on meta data associated with an individual represented in the persistent overlay.

9. The method as recited in claim 1, wherein determining the relative importance value of the persistent overlay is based on meta data describing a media item represented in the persistent overlay.

10. An electronic device arranged to present visual information at a display, comprising:
an input device; and
a processor in co-operative communication with the input device, wherein the input device provides an input signal that the processor uses to identify and process a portion of a first page of visual information presented at the display as a persistent overlay, wherein the processor further acts to:
automatically add the visual information associated with the persistent overlay to that presented as the first page by overlaying a corresponding portion of the first page with the persistent overlay, wherein at least some of the overlaid visual information of the first page remains viewable, and
add the visual information associated with the persistent overlay to that of a subsequently displayed page by overlaying a corresponding portion of the subsequently displayed page with the persistent overlay such that at least some visual information displayed as part of the subsequently displayed page, and overlaid by the persistent overlay, remains viewable, wherein the persistent overlay is rendered in accordance with a relative importance of the persistent overlay to the subsequently displayed page, and includes updateable metadata associated with the visual information corresponding to the persistent overlay, the visual content of the subsequently displayed page and the persistent overlay are presented as a unified visual field, and the information presented as the unified visual field includes an area of the subsequently displayed page presenting an application icon arranged to initiate execution of a corresponding application, the application processing data associated with the persistent overlay corresponding to the second page.

11. The device as recited in claim 10, wherein the processor further modifies a transparency factor of the persistent overlay in accordance with a number of pages on which the persistent overlay is added.

12. The device as recited in claim 10, wherein the device further comprises:
a data storage device arranged to store data that includes at least media data, wherein the processor updates the data storage device with a persistent overlay identifier used to identify the persistent overlay.

13. The device as recited in claim 12, wherein the processor displays the persistent overlay identifier at the display in the form of an interactive clipboard.

14. The device as recited in claim 10, wherein the processor determines the relative importance value of the persistent overlay is based on meta data associated with an individual represented in the persistent overlay.

15. The device as recited in claim 10, wherein the processor determines the relative importance value of the persistent overlay is based on meta data describing a media item represented in the persistent overlay.

16. A non-transitory computer readable medium arranged to store a computer code executed by a processor, the computer readable medium comprising:
computer code for presenting a first page of visual information at a display;
computer code for identifying a portion of the presented visual information;
computer code for rendering the identified portion as a persistent overlay, wherein the persistent overlay allows any overlaid visual information to remain at least partially viewable;
computer code for presenting a second page subsequent to the presenting the first page; and
computer code for presenting the persistent overlay as part of the second page such that at least some visual information displayed as part of the second page, and overlaid by the persistent overlay, remains viewable, wherein the persistent overlay is rendered in accordance with a relative importance of the persistent overlay to the second page, the visual content of the second page and the persistent overlay are presented as a unified visual field, and the information presented as the unified visual field includes an area of the second page presenting an application icon arranged to initiate execution of a corresponding application, the application processing data from the persistent overlay corresponding to the second page.

17. The computer readable medium as recited in claim 16, further comprising:
computer code for presenting the persistent overlay as part of the first page immediately after the rendering; and
computer code for storing a persistent overlay identifier used to identify the persistent overlay.

18. The computer readable medium as recited in claim 17, further comprising:
computer code for associating metadata with the persistent overlay, wherein the metadata provides ancillary information about the persistent overlay.

19. The computer readable medium as recited in claim 18, further comprising:
computer code for using the metadata associated with the persistent overlay as an input to an application.

20. The computer readable medium as recited in claim 16, wherein determining the relative importance value of the persistent overlay is based on meta data associated with an individual represented in the persistent overlay, or meta data describing a media item represented in the persistent overlay.

* * * * *